United States Patent [19]

Ortlieb

[11] Patent Number: 4,473,937

[45] Date of Patent: Oct. 2, 1984

[54] SYSTEM FOR AUTOMATIC FINE ADJUSTMENT OF TOOLS

[75] Inventor: Robert M. Ortlieb, Southfield, Mich.

[73] Assignee: De Vlieg Machine Company, Royal Oak, Mich.

[21] Appl. No.: 415,662

[22] Filed: Sep. 7, 1982

[51] Int. Cl.³ .......................................... B23Q 3/157
[52] U.S. Cl. ..................................... 29/568; 29/26 R; 408/35
[58] Field of Search ...................... 29/568, 26 A, 26 R; 408/35

[56] References Cited

U.S. PATENT DOCUMENTS

| | | | |
|---|---|---|---|
| 1,506,484 | 8/1924 | Hart | 408/114 |
| 1,981,224 | 11/1934 | De Vlieg | 409/208 |
| 2,002,991 | 5/1935 | De Vlieg | 409/146 |
| 2,059,091 | 10/1936 | De Vlieg | 405/146 |
| 2,119,705 | 6/1938 | De Vlieg | 740/441 |
| 2,123,825 | 7/1938 | De Vlieg | 409/206 |
| 2,330,692 | 9/1943 | De Vlieg | 408/185 |
| 2,484,480 | 10/1949 | Anderson | 408/181 |
| 2,537,517 | 1/1951 | De Vlieg | 408/153 |
| 2,652,634 | 9/1953 | De Vlieg | 408/238 |
| 2,654,610 | 10/1953 | De Vlieg | 408/181 |
| 2,771,798 | 11/1956 | De Vlieg | 408/178 |
| 2,793,547 | 5/1957 | Benjamin et al. | 408/153 |
| 2,849,902 | 9/1958 | De Vlieg et al. | 408/181 |
| 2,901,935 | 9/1959 | Keller, Jr. et al. | 408/153 |
| 3,011,113 | 11/1961 | Jerue et al. | 409/80 |
| 3,044,323 | 7/1962 | Sweeny | 408/151 |
| 3,069,932 | 12/1962 | Sweeny et al. | 408/185 |
| 3,217,569 | 11/1965 | Sweeny | 408/153 |
| 3,232,144 | 2/1966 | Sweeny | 408/153 |
| 3,262,184 | 7/1966 | Sweeny | 408/153 |
| 3,292,238 | 12/1966 | De Vlieg | 408/226 |
| 3,327,386 | 6/1967 | Jerue | 29/568 |
| 3,338,117 | 8/1967 | De Vlieg et al. | 408/153 |
| 3,402,625 | 9/1968 | Sweeny | 408/146 |
| 3,417,662 | 12/1968 | De Vlieg et al. | 409/207 |
| 3,449,823 | 6/1969 | Jerue | 29/568 |
| 3,684,939 | 8/1972 | Perry | 409/210 |
| 3,689,988 | 9/1972 | Jerue | 29/568 |
| 3,699,843 | 10/1972 | Sweeny | 408/226 |
| 3,810,299 | 5/1974 | Jerue | 29/568 |
| 3,823,466 | 7/1974 | Jerue | 29/560 |
| 3,823,642 | 7/1974 | Jerue | |
| 3,947,951 | 4/1976 | Jerue | 29/568 |
| 4,043,696 | 8/1977 | Wohlhaupter | 408/153 X |
| 4,204,782 | 5/1980 | Spits et al. | 29/568 |
| 4,250,775 | 2/1981 | Jerue et al. | 82/1 C |

FOREIGN PATENT DOCUMENTS 774918  10/1980  U.S.S.R. ............................ 29/568

OTHER PUBLICATIONS

"De Vlieg Microbore 'AR' Automatic Retracting Lay-in Cartridges," (De Vlieg Machine Company, 1980).
"Microbore AH Adjustable Boring Heads" (De Vlieg Machine Company, date unknown).

Primary Examiner—William R. Briggs
Attorney, Agent, or Firm—Harness, Dickey & Pierce

[57] ABSTRACT

A novel machining center having a plurality of tools, including adjustable tools incorporating an externally accessible rotatable socket for fine-adjusting the tool bit thereon; a tool drive for actuating each tool; a storage device for storing a plurality of tools, at least one of which is one of the adjustable tools, the storage device being operable to move the tools between first and second positions; an automatic tool changer for transporting a tool in both directions between said first position and the tool drive; a powered wrench engagable with said socket on an adjustable tool disposed in said second position; a numerical controller for controlling the operations of said machining center; and a technique for inputing to the control means information as to the identity of a given adjustable tool requiring adjustment and the amount of adjustment desired, said powered wrench being actuatable to engage said socket of said given adjustable tool in response to said information when the given tool is in said second position. A novel method of handling tools is also disclosed.

4 Claims, 12 Drawing Figures

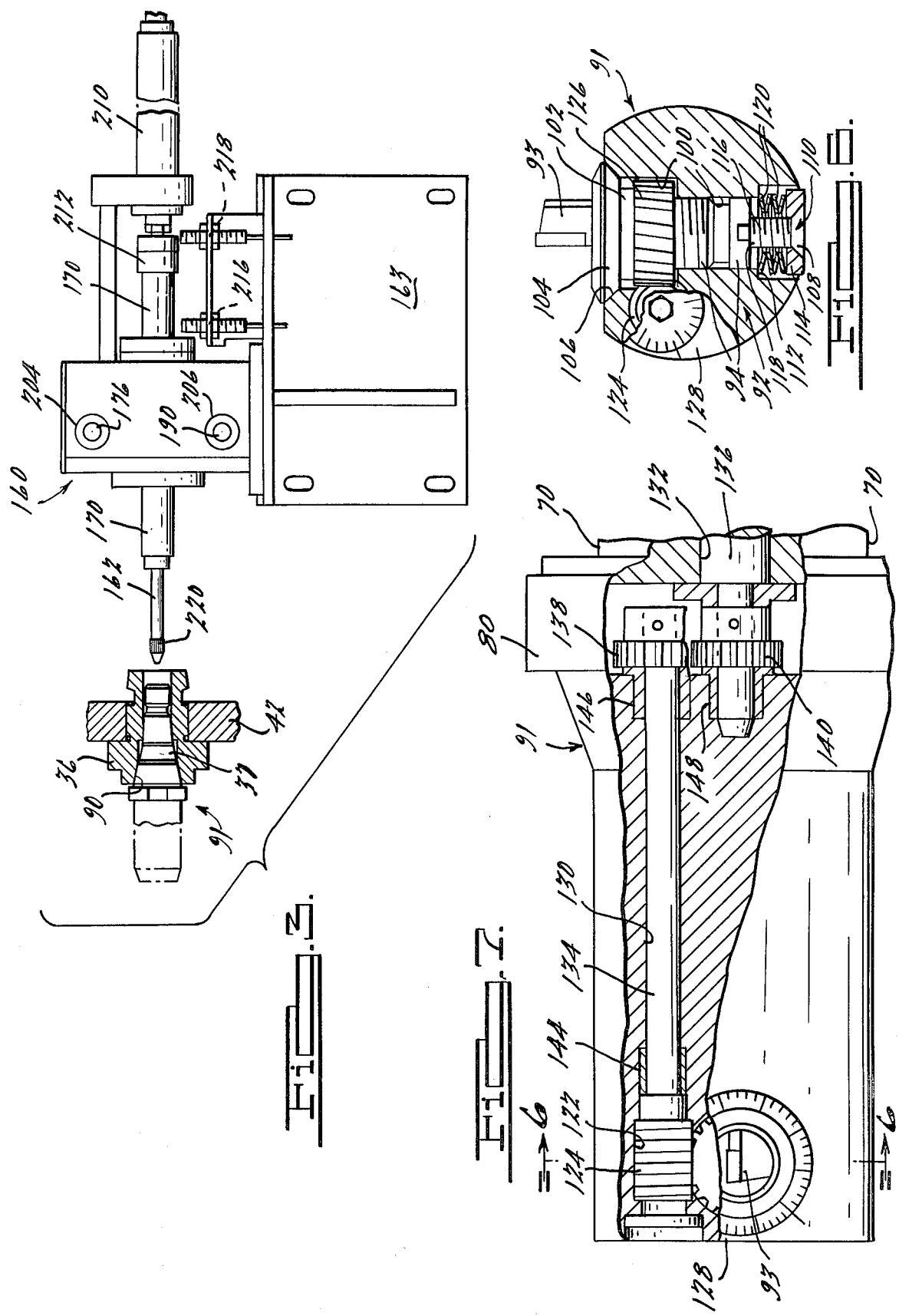

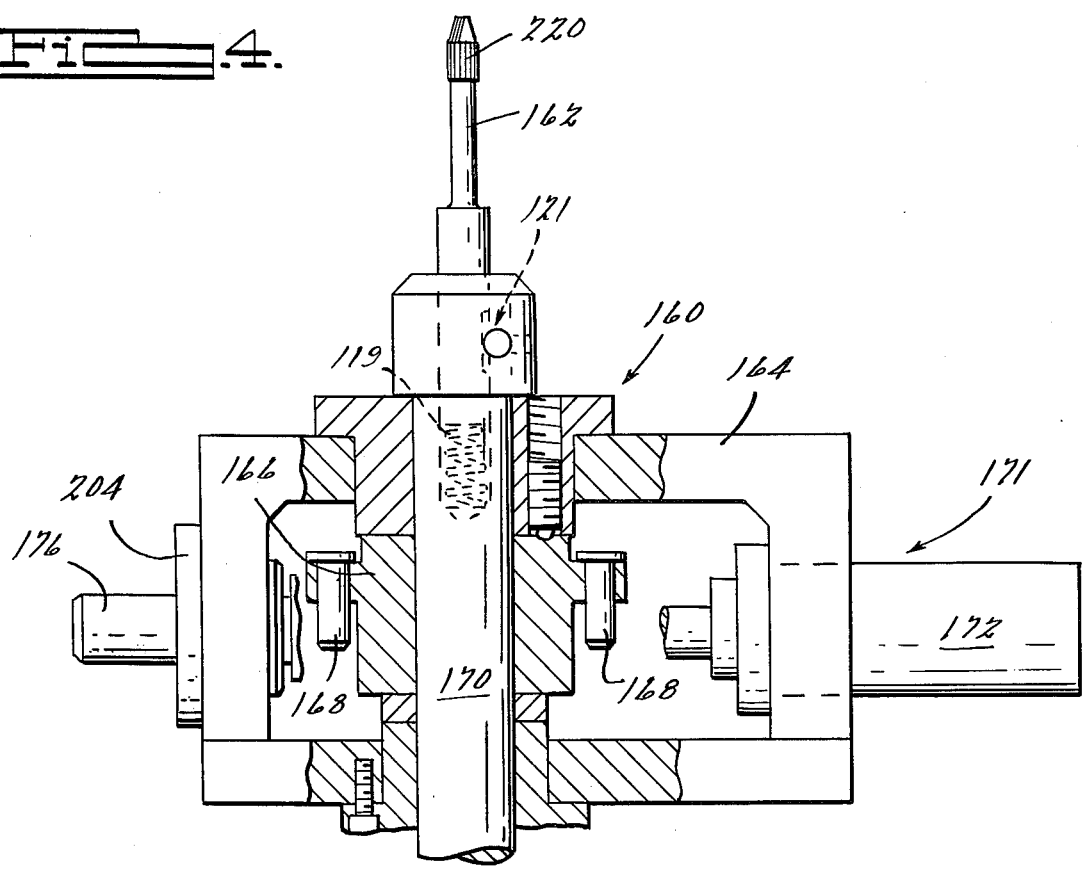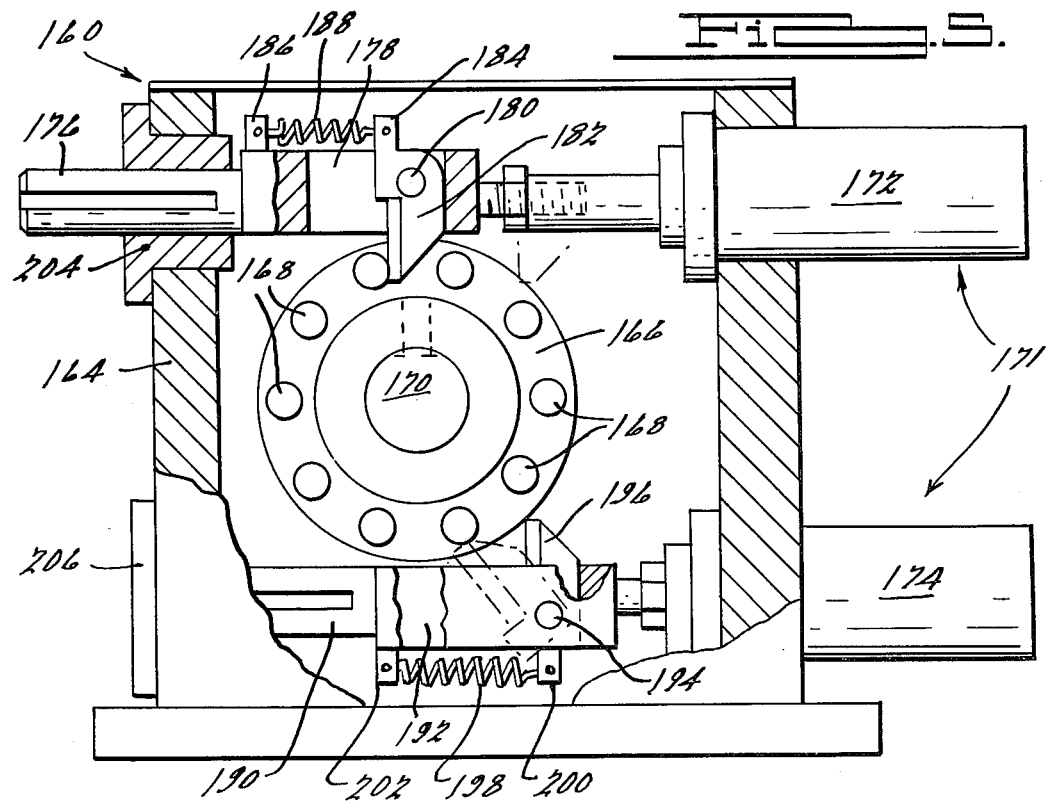

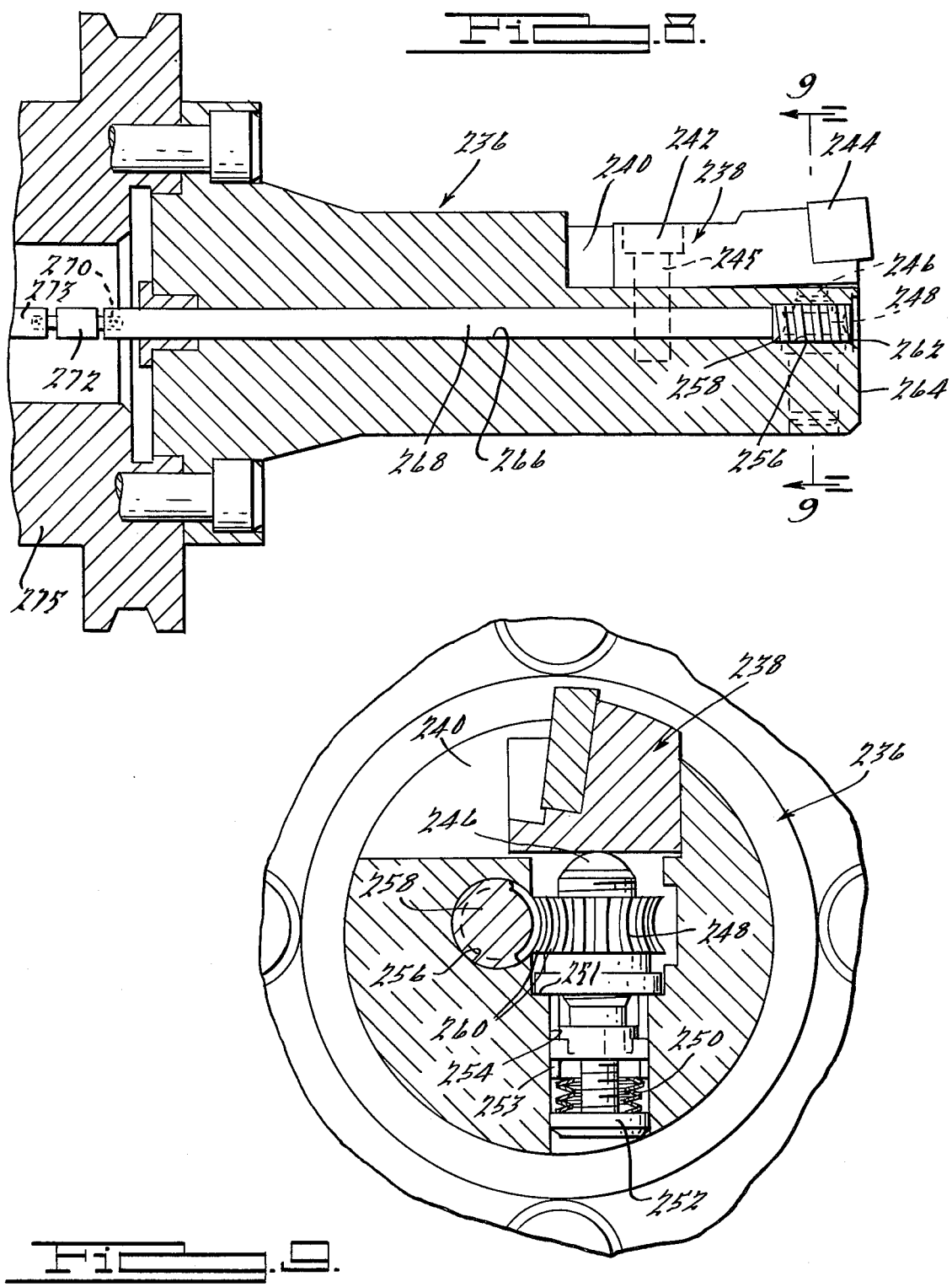

SYSTEM FOR AUTOMATIC FINE ADJUSTMENT OF TOOLS

BACKGROUND AND SUMMARY OF THE INVENTION

A variety of machine tools have been introduced in recent years which embody the concept of "automatic tool changing". Such machines, sometimes referred to as "machining centers", function automatically (or semi-automatically) under computer or numerical control and employ a tool storage device in which the metal cutting tools to be used on a given workpiece are stored. The tools perform milling, drilling, boring, tapping, reaming, and various other metal cutting functions. All of such tools have a shank which is received within the socket of a drive spindle of the machine. Many automatic tool changing machines incorporate some type of interchange tool handling mechanism by which the tool is extracted from the tool storage device and is inserted in the machine spindle, such as that disclosed in U.S. Pat. No. 3,947,951, issued on Apr. 6, 1976. In other machines the entire tool storage device is moved to position a desired new tool in alignment with the machine spindle and the spindle itself extracts the desired tool from tool storage. Yet other arrangements are also used.

Tool adjustment, particularly fine adjustment, such as is required to account for tool bit wear and replacement in these machines is usually performed either when the tool is mounted in the machine spindle or in a separate presetting machine. Thus, such adjustment techniques suffer the disadvantages of either preventing the machine from performing cutting functions while fine adjustments are being made or requiring separate operations with separate machines.

It is a primary object of the present invention to overcome these disadvantages utilizing an apparatus for fine adjusting tools which is accurate, rugged, reliable, relatively inexpensive and easy to use on many different types of machining centers having different types of tool changing systems. A related object resides in the provision of an improved method for automatically fine adjusting tools.

The present invention takes advantage of the fact that such tool storage devices are under numerical control and necessarily must maintain each tool in an accurately predetermined position to provide automatic fine adjustment while the tool is in tool changer storage. This is accomplished utilizing a unique tool construction which incorporates novel fine adjustment means which may be remotely accessed from the back (or axially inner) end thereof, in combination with a numerically controlled powered wrench located in the tool storage area. This tool construction per se is the subject of the applicant's co-pending application entitled "PRECISION ADJUSTABLE CUTTING TOOL" filed of even date.

These and other features and advantages of the present invention will become apparent from the subsequent description and the appended claims, taken in conjunction with the accompanying drawings.

BRIEF DESCRIPTION OF THE DRAWINGS

FIG. 3 is an enlarged side elevational view of a boring bar and fine adjustment mechanism embodying the principles of the present invention;

FIG. 4 is an enlarged plan view of a portion of the adjustment mechanism of FIG. 3 with parts broken away;

FIG. 5 is a rear elevational view of the mechanism of FIG. 4 with parts broken away;

FIG. 6 is a sectional view taken along line 6—6 in FIG. 7;

FIG. 7 is a fragmentary plan view of a portion of the tool of FIG. 6 with parts broken away to show internal structure;

FIG. 8 is a horizontal sectional view of an alternative embodiment of a boring bar incorporating the principles of the present invention;

FIG. 9 is a sectional view taken along line 9—9 in FIG. 8;

DESCRIPTION OF THE PREFERRED EMBODIMENTS

Figure 1:
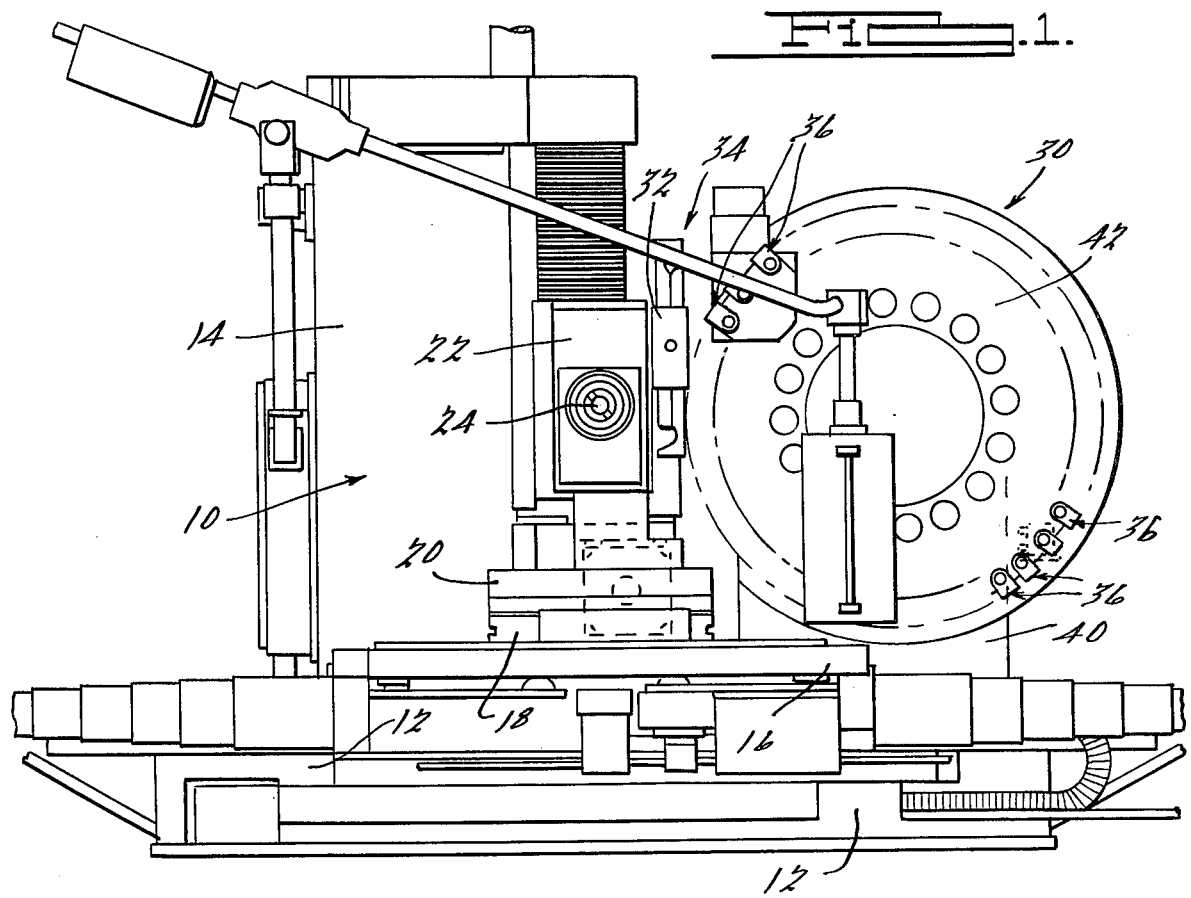
FIG. 1 is a partial front elevational view of a machining center having a tool changer ideally suited for use of the present invention.
Figure 2:
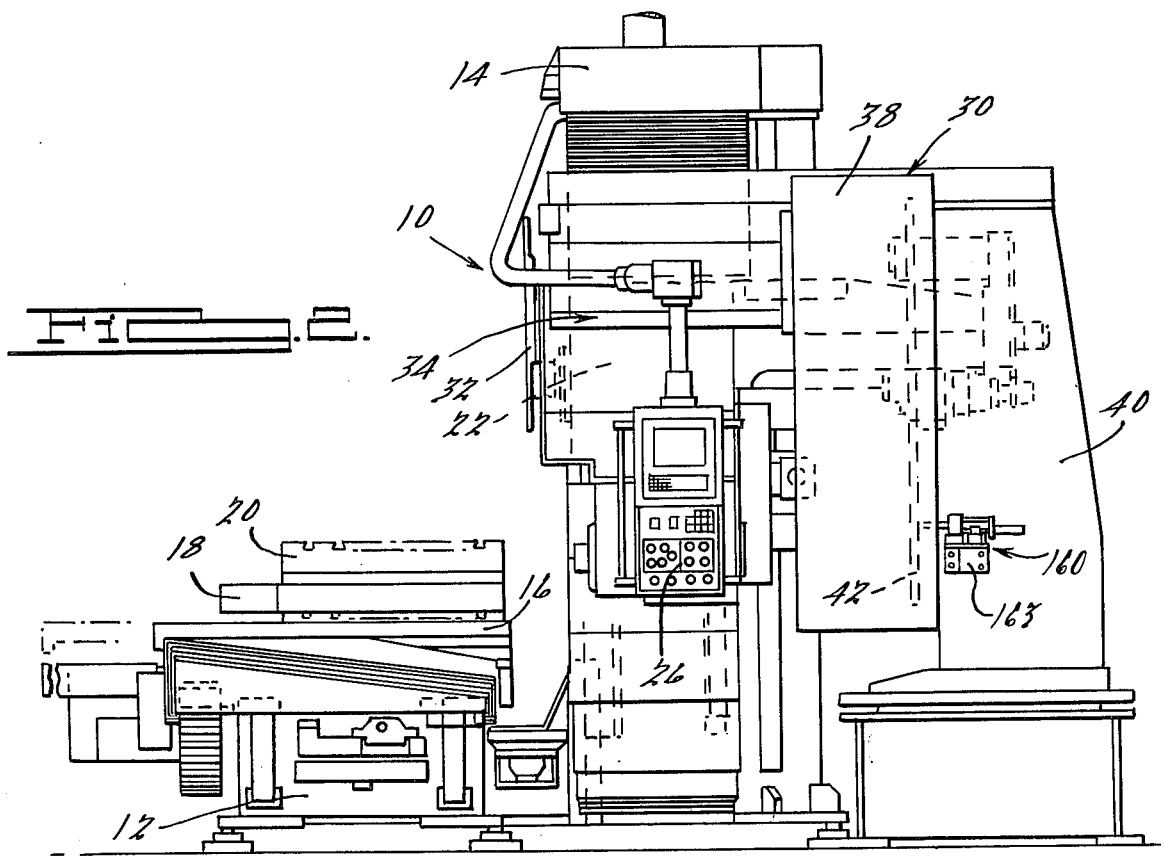
FIG. 2 is a side elevational view of the machining center of FIG. 1.

Referring now to FIG. 1, a representative conventional horizontal boring machining center is illustrated at 10. Machine 10 employs a customary bed 12, a vertical column 14, a saddle 16 mounted on bed 12 for horizontal rectilinear movement, a table 18 mounted on saddle 16 for horizontal movement perpendicular to the direction of movement of saddle 16, a rotary work table 20 mounted on table 18, and a spindle head 22 which carries a rotary drive spindle 24 and is mounted on column 14 for vertical movement thereon. A standard pendant control panel is illustrated at 26 where it is conveniently reached by the machine operator. Panel 26 is wired to a conventional numerical control unit (not shown) in the usual manner. The console may be of the conventional tape program type or any other suitable type and directs the functioning of the entire center, subject to the input of certain manual controls from panel 26. The center includes a tool storage device 30 for the storage of a plurality of cutting tools to be used on machine 10. Tools are supported in tool holders 36 detachably fixed to a rotating wheel 42 forming part of storage device 30. As it is needed, each tool is transported from wheel 42 in a tool holder 36 by means of a horizontal shuttle assembly 34 to an "interchange" position adjacent spindle 24. From there, the tool is interchanged with the tool currently in the spindle by means of an interchange mechanism 32. In this embodiment, tool changer 30 is a floor mounted free standing structure, however the invention is applicable to other types of tool changers.

The structure and operation of the tool storage device 30, and tool holders 36, shuttle assembly 34, spindle 24, interchange mechanism 32, and other aspects of the machine are fully described independently in a similar construction in U.S. Pat. No. 3,947,951, issued on Apr. 6, 1976, which patent is incorporated herein by reference.

Referring to FIG. 3, each holder 36 has a tapered socket 90 designed to receive the shank 37 of a tool, such as the boring bar shown partially in phantom at 91. Tool holders 36 are simple in design and completely interchangeable. The tool holder which is used to bring a new tool to the spindle is of the same configuration as the tool holder used to return an old or previously used tool into the tool storage device, in accordance with the teachings of the aforesaid patent.

In accordance with the present invention, the various boring bars and other tools used are internally modified to provide a unique capability of fine adjustment from the axially inner end of the tool shank. These adjustable tools, as utilized herein, are described fully in applicant's copending application entitled "PRECISION ADJUSTABLE CUTTING TOOL", filed of even date, the disclosure of which is incorporated herein by reference. These tools are only generally described herein.

One embodiment of such a tool is illustrated in FIGS. 6 and 7. The tool in this embodiment is a boring bar 91 and has an adjustable cutting tool cartridge assembly 92 disposed within a transversely-extending cartridge bore 100, and a conventional mounting flange 80 and shank 70 (only partially shown). Cartridge assembly 92 includes a tool bit 93 having an externally threaded cylindrical portion 94 which is advanced or retracted in response to rotation of an internally threaded collar member 102 having a conical head 104 that engages a corresponding conical seat 106 in the bar. Tool bit 93 is keyed to the interior of cartridge bore 100 so that when collar 102 is rotated, tool bit 93 may advance or retract with respect to the boring bar but may not rotate. A number of Belleville washers 120 disposed around a locking screw 110 (threadably engaged with the tool bit) and between a shoulder 112 and an annular collar 114 retained by head 108 of screw 110 resiliently hold the cartridge assembly 92 in its seated position and take up any backlash in threads 94.

In order to adjust the radial position of tool bit 93 relative to boring bar 91, collar 102 is rotated to threadably advance or retract the tool bit 93. Collar 102 includes graduated markings to indicate the amount of change in radial position of the tool bit.

A second bore 122 through tool 91 is generally perpendicular and adjacent to cartridge bore 100 and receives a worm gear 124 which engages external gear teeth 126 on cartridge collar 102. Worm gear 124 and collar 102 are geared so that a large number of turns of worm gear 124 causes only a small movement of tool bit 93, thus providing a high torque advantage for overcoming the friction between conical head 104 and conical seat 106, and the capacity for very precise adjustments. The worm gear assembly may also be provided with markings on the adjoining face 128 of boring bar 91 for the purpose of indicating change in tool bit position.

Because of the combination of the high torque advantage provided by the gearing between the worm gear and the collar, and the resiliency of the Belleville washers, locking screw 110 need not be loosened to allow collar 102 to rotate during fine adjustments. Thus, thread backlash is taken up and tool bit 93 remains centered throughout the adjustment period. If the range of movement accommodated by the washers is exceeded, then screw 110 can be repositioned with respect to the tool bit.

Boring bar 91 also has axially extending bores 130 and 132 in its body and shank portions, respectively, in which are disposed respective shafts 134 and 136 which are interconnected via a pair of pinion gears 138 and 140. Bore 130 is coaxial with bore 122 and shaft 134 is connected to and drives worm gear 124. Shaft 136, which is disposed on the center axis of the tool, has at its rightmost end as shown (which is substantially flush with the end of the shank of the tool) an axial driving socket having internal spines or teeth (the same as socket 394 in FIG. 10). Shafts 134 and 136 move in suitable bearings 144 and 146 and 148 and 150, respectively.

One of the unique features of the present invention is the provision of a numerically controlled powered wrench in the tool storage area of the machining center for the purpose of providing automatic fine adjustment of individual tools. A representative design of such powered wrench drive mechanism is shown at 160 in FIGS. 3, 4 and 5, and includes a drive shaft 162 having a plurality of radially outwardly disposed splines which fit within the driven aperture (not shown) of tool shaft 136. Drive mechanism 160 is mounted on a vertical support structure forming a part of storage device 30 adjacent wheel 42 of, and is adapted to be associated with, each of the tool holders 36 disposed on the wheel 42 on an individual basis.

Drive mechanism 160 comprises a housing 164 within which is disposed an indexer in the form of a drive wheel 166 having a plurality of axially extending drive lugs 168 extending parallel to the axis of rotation of wheel 166 at radially outwardly circumferentially spaced positions. Wheel 166 is mounted on a shaft 170 which is in turn operably connected to drive shaft 162. As best seen in FIG. 4, drive element 162 is slidably mounted within a central bore in the end of shaft 170 a shock absorbing spring 119 is disposed between the end of the bore and drive element 162 to protect the mechanism in the event there is misalignment between the wrench and socket. Drive element 162 is retained in shaft 170 by means of a pin and slot arrangement 121. The construction between wheel 166 and shaft 170 is such that they rotate together, but shaft 170 is free to reciprocate with respect to wheel 166. Wheel 166 is rotated by a control mechanism 171 having a plus air cylinder 172 and a minus air cylinder 174, wherein the plus air cylinder 172 drives the wheel 166 in a counterclockwise direction as shown and a minus air cylinder 174 drives the wheel 166 in a clockwise direction as shown. Plus air cylinder 172 is connected to a reciprocally mounted shaft 176 which has a vertical slot 178 therethrough through which a pin 180 extends upon which a pawl 182 is rotatively disposed. Pawl 182 has a lug 184 at one end thereof and shaft 176 has a lug 186. Between lugs 184 and 186 an extension spring 188 is disposed to normally bias pawl 182 into the vertically downward position shown. Similarly, minus air cylinder 174 is attached to a shaft 190 having a vertical slot 192 through which extends a pin 194 upon which is disposed a pawl 196 facing in the opposite direction and biased in a normally vertically upward position by an extension spring 198 extending between a lug 200 on a pawl 196 and a lug 202 on shaft 190. Shafts 176 and 190 reciprocate within suitable bearings 204 and 206, respectively, within housing 164, and are suitably keyed to prevent rotation with respect to the housing.

Drive mechanism 160 also includes an actuator comprising a pneumatic cylinder 210 having a piston to which is attached a sensing block 212, which in turn is connected to shaft 170. Sensing block 212 moves between two proximity switches 216 and 218. Pneumatic cylinder 210, when actuated under numerical control, causes wrench 220 of drive shaft 162 to move into engagement with the splined socket in the end of shaft 136 of the boring bar, and when it is deactuated the wrench is withdrawn. The output of the proximity switch is connected to the numerical controller, which causes wrench 220 to move between the physical limits established by the switches. If 10 drive lugs 168 are provided, a single actuation of either cylinder 172 or 174 will cause wheel 166, and hence wrench 220, to be rotated one tenth of a revolution in the direction governed by the cylinder chosen. The number of splines in the driven socket and on wrench 220 should correspond to the number of drive lugs 168. It should be appreciated that other types of indexers can be used, such as stepping motors, Geneva wheels, and like devices, in order to accomplish the desired numerically controlled function.

A second embodiment of a representative boring bar is illustrated at 236 in FIGS. 8 and 9. Boring bar 236 has a lay-in adjustable cutting tool insert 238 received within an axially extending slot 240 in the outer periphery of bar 236. Insert 238 includes a body portion 242 affixed to a tool bit 244, secured to the boring bar by a screw 245. The tool is fine adjusted by physically deflecting the outer end of the insert using an externally threaded biasing block 246 which is advanced or retracted in response to rotation of an internally threaded collar 248. A number of Belleville washers 250 on a biasing screw 252 threaded into biasing block 246 act against an annular abutment 253 to resiliently hold the biasing block 246 in its sealed position against a load bearing shoulder 251, and take up the backlash in the threads when no force is being exerted against the insert. All of the above is disposed in a transversely-extending bore 254 in holder 236.

Another bore 256 extending axially through tool 236, generally perpendicular and adjacent to cartridge bore 254, receives a worm gear 258 which engages external gear teeth 260 on collar 248. Worm gear 258 and collar 248 are geared so that a large number of turns of worm gear 258 causes only a small movement of tool bit 244. Worm gear 258 is rotated to finely adjust the tool bit 244 to a desired position. It may also be provided with markings on the outer adjustment face 262 thereof to indicate changes in tool bit position.

Tool 236 also has an axial bore 266 through which a shaft 268 extends, the outer end of which is attached to worm gear 258. The inner end of shaft 268 is attached to a universal joint 272 in turn connected to a drive shaft 273 which extends for the length of the shank 275 of tool 236 along the center axis thereof, and has at the inner end thereof a splined driven socket similar to that of the preceding embodiment. Wrench 220 engages the end of the drive shaft in accordance with numerically controlled instructions to make fine adjustments to the tool bit in either the plus or minus direction, as aforesaid.

Figures 10, 11, 12:
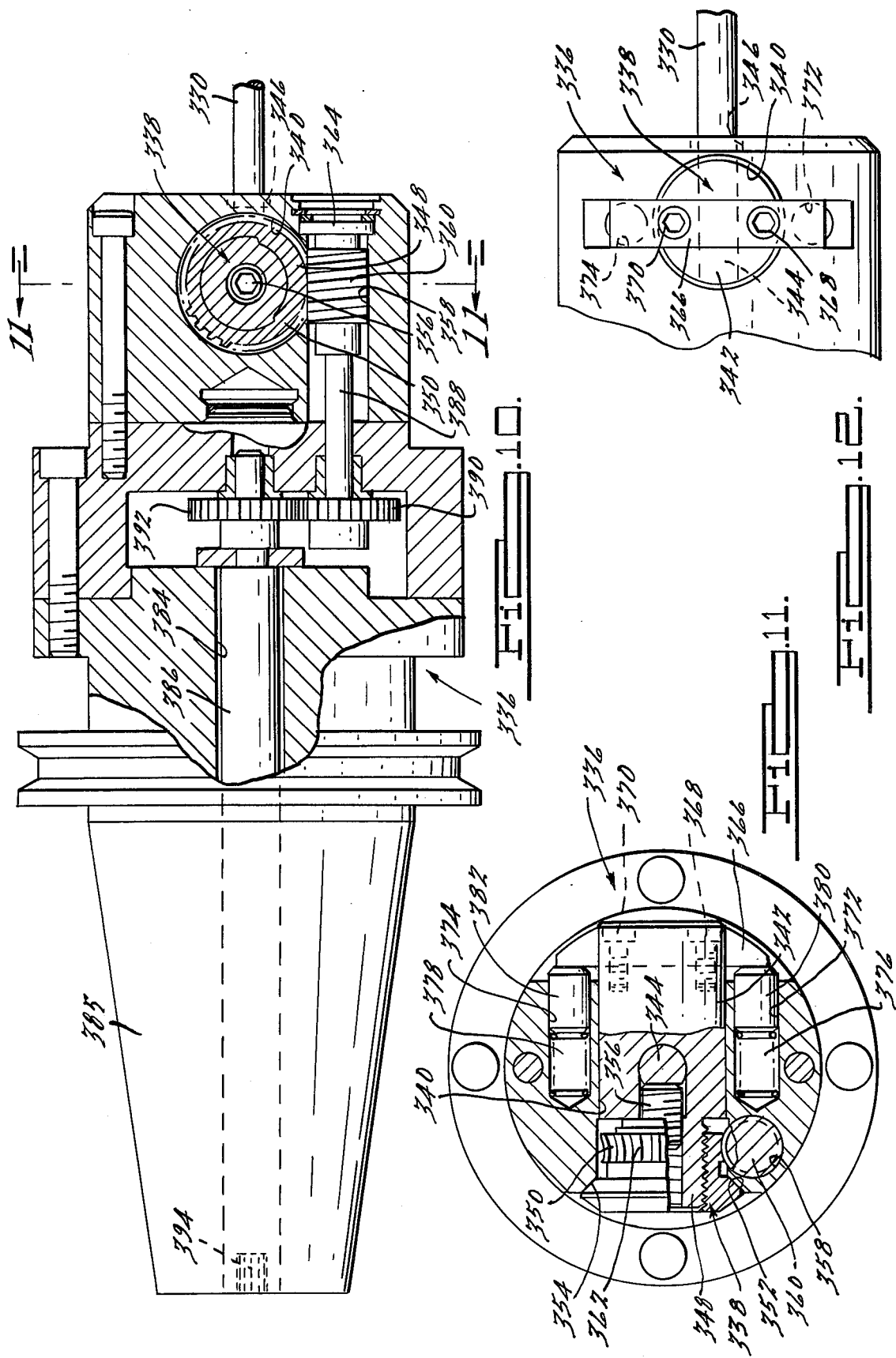
FIG. 10 is a plan view, partly in section, of a further alternative embodiment of a boring bar incorporating the principles of the present invention.
FIG. 11 is a sectional view taken along the line 11—11 in FIG. 10.
FIG. 12 is a partial bottom plan view of the boring bar of FIG. 10.

FIGS. 10, 11 and 12 illustrate at 336 a further embodiment of a tool in the form of a boring head utilizeable with the present invention for small diameter bored holes. Tool 336 has an adjustable cutting tool cartridge assembly 338 disposed within a transversely-extending cartridge bore 340. Cartridge assembly 338 comprises a slide element 342 movable in the cartridge bore, the shank 344 of a small diameter boring tool 330 being disposed in a transverse hole in the slide element and being retained in place by a set screw 356. A slot 346 is provided in tool 336 to receive boring tool 330 for movement along a line of movement parallel to the axis of movement of the slide element in the cartridge bore. Cartridge assembly 338 includes an integral externally threaded slide portion 348 extending from slide element 342, which is advanced or retracted in response to rotation of an internally threaded collar member 350 having a conical head 352 that engages a corresponding conical seat 354 in tool 336. Locking screw 356 extends through the center of slide portion 348 to lock the tool to the slide element.

In order to adjust the radial position of tool 330, collar 350 is rotated to threadably advance or retract slide element 342 and tool 330. Collar 350 includes graduated markings to indicate the change in radial position of the tool.

Another bore 358 extends axially through tool 336, perpendicular and adjacent cartridge to bore 340, and receives a worm gear 360 which engages external gear teeth 362 on cartridge collar 350. Worm gear 360 and collar 350 are geared so that a large number of turns of worm gear 360 causes only a small movement of tool 330. Thus a high torque advantage is provided for overcoming the friction and very fine adjustments in tool bit position are possible. The worm gear may also be provided with a head 364 having markings indicating changes in tool bit position.

Slide element 342 has a cross beam 366, fixedly secured to the opposite end thereof by screws 368 and 370. Two bores 372 and 374 are disposed in tool holder 336 within which two springs 376 and 378 and two dowel pins 380 and 382 are respectively disposed. Springs 376 and 378 (which may be either coil springs as shown, or Belleville washer springs) bias dowel pins 380 and 382 outwardly from bores 372 and 374 to act against cross beam 366 to bias slide element 342 in a direction to firmly urge collar 350 against conical seat 354. Thus, thread backlash is taken up and the tool remains centered even during adjustment.

Tool 336 also has an axial bore 384 extending axially along the center axis of shank 385 of the tool in which is rotatably disposed a shaft 386 having at its outer end a pinion gear 392 which engages a pinion gear 390 on a shaft 388 disposed in axial bore 358. The other end of shaft 388 is drivingly connected to worm gear 360. Shaft 386 has at its axially inner end a splined driven socket 394. Wrench 220 is adapted to engage socket 294 as described above to automatically fine adjust the tool bit.

The numerical control of the present apparatus (which control is intended to control all tape, computer and like controllers) can in all respects be accomplished using conventional techniques and equipment well known to those skilled in the art. The amount of adjustment desired for a given tool may be determined in the usual manner and input to the controller may be done either manually or automatically in accordance with standard procedures. The controller will always necessarily know the location of a given tool in the tool storage device and hence when it is positioned in alignment with the powered wrench. It can also easily calculate how many times to index the wrench to make the desired adjustment. For example, if the worm drive is of a ratio to give 0.001" adjustment on a full rotation of its adjustment input shaft, and the indexer has a ten-to-one ratio; then a single acutation of the wrench drive mechanism will cause the tool to be advanced or retracted 0.0001". Therefore, if a 0.0003" adjustment is required the drive mechanism will be actuated three times in the desired direction. Actuation of actuating cylinder 210 can be similarly controlled to assure that the wrench is engaged with the driven socket for the worm adjustment means prior to indexing and is withdrawn upon completion of indexing, all in response to the input of the proximity sensing switches. Such actuation can be accomplished using conventional controller-actuated solenoid valves in the pneumatic (or hydraulic if desired) system which powers the indexing cylinders, all using well known techniques and equipment.

Similarly, the principles of the present invention may be applied to other types of tools having similar externally accessible fine adjustment means.

Thus, there is disclosed in the above description and in the drawings an improved machine tool and method which fully and effectively accomplish the objectives thereof. However, it will be apparent that variations and modifications of the disclosed embodiments may be made without departing from the principles of the invention or the scope of the appended claims.

I claim:

1. A method of automatically handling and maintaining tools in a machining center having
   a plurality of tools, including adjustable tools incorporating externally accessible driven means for fine-adjusting the tool bit thereon,
   storage means for storing a plurality of said tools, at least one of which is one of said adjustable tools,
   automatic tool changing means for transporting a tool in both directions between said storage means and said tool drive means,
   powered adjusting means engagable with said driven means on an adjustable tool disposed in said storage means, and
   numerical control means for controlling the operations of said machining center,
said method comprising the following steps:
   inputing to said control means information as to the identity of a given adjustable tool requiring adjustment and the amount of adjustment desired,
   actuating said powered adjusting means to adjust said driven means of said given adjustable tool in response to said information when said given tool is in said storage means,
   thereafter automatically transporting said adjusted tool to said tool drive means.

2. A method of automatically handling and maintaining tools in a machining center having
   a plurality of tools, including adjustable tools incorporating externally accessible driven means for fine-adjusting the tool bit thereon,
   tool drive means for actuating each said tool,
   storage means for storing a plurality of said tools, at least one of which is one of said adjustable tools, said storage means being operable to move said tools between first and second positions,
   automatic tool changing means for transporting a tool in both directions between said first position and said tool drive means,
   powered adjusting means engagable with said driven means on an adjustable tool disposed in said second position, and
   numerical control means for controlling the operations of said machining center,
said method comprising the following steps:
   inputing to said control means information as to the identity of a given adjustable tool requiring adjustment and the amount of adjustment desired,
   actuating said powered adjusting means to engage said driven means of said given adjustable tool in response to said information when said given tool is in said second position,
   thereafter actuating said powered adjusting means to fine-adjust said given adjustable tool,
   thereafter actuating said powered adjusting means to disengage from said given tool,
   thereafter moving said given tool to said first position, and
   thereafter automatically transporting said adjusted tool to said tool drive means.

3. A machining center having:
   a plurality of tools, including adjustable tools incorporating externally accessible driven means for fine-adjusting the tool bit thereon,
   tool drive means for actuating each said tool,
   storage means for storing a plurality of said tools, at least one of which is one of said adjustable tools, said storage means being operable to move said tools between first and second positions,
   automatic tool changing means for transporting a tool in both directions between said first position and said tool drive means,
   powered adjusting means engagable with said driven means on an adjustable tool disposed in said second position,
   numerical control means for controlling the operations of said machining center including said powered adjusting means, and
   means for inputing to said control means information as to the identity of a given adjustable tool requiring adjustment and the amount of adjustment desired,
   said powered adjusting means being actuatable to engage said driven means of said given adjustable tool in response to said information when said given tool is in said second position.

4. In a numerically controlled machine center having tool storage means, an automatic tool changer and tools in said storage means having externally accessible adjusting means for adjusting a tool bit thereon, the improvement comprising:
   engaging means disposed in the area of said storage means and adapted to drivingly engage said adjusting means on a tool;
   actuating means for causing said engaging means to engage and disengage the adjustment means of a tool when the latter is in a predetermined position in said storage means; and
   indexing means for indexing said engaging means while engaged with said adjusting means to fine-adjust a tool bit thereon.

* * * * *

UNITED STATES PATENT AND TRADEMARK OFFICE
CERTIFICATE OF CORRECTION

PATENT NO. : 4,473,937
DATED : October 2, 1984
INVENTOR(S) : Robert M. Ortlieb

It is certified that error appears in the above-identified patent and that said Letters Patent is hereby corrected as shown below:

Column 1, line 56, after "subject" insert -- matter--.

Column 1, line 56, after "of" delete -- the --.

Column 3, line 16, after "are" insert -- therefore --.

Column 4, line 7, "spines" should be -- splines --.

Column 5, line 31, "sealed" should be -- seated --.

Column 7, line 31, delete "said" and insert therefor -- a --.

Signed and Sealed this

Eighteenth Day of June 1985

[SEAL]

Attest:

DONALD J. QUIGG

Attesting Officer     Acting Commissioner of Patents and Trademarks